US011772731B2

(12) United States Patent
Tou et al.

(10) Patent No.: US 11,772,731 B2
(45) Date of Patent: Oct. 3, 2023

(54) VEHICLE OPERATION DEVICE

(71) Applicants: HONDA MOTOR CO., LTD., Tokyo (JP); ASAHI DENSO CO., LTD., Hamamatsu (JP)

(72) Inventors: Akinori Tou, Tokyo (JP); Ryohei Kitamura, Tokyo (JP); Masayuki Hashimoto, Tokyo (JP); Sho Sugimoto, Hamamatsu (JP)

(73) Assignees: HONDA MOTOR CO., LTD., Tokyo (JP); ASAHI DENSO CO., LTD., Hamamatsu (JP)

( * ) Notice: Subject to any disclaimer, the term of this patent is extended or adjusted under 35 U.S.C. 154(b) by 0 days.

(21) Appl. No.: 17/676,387

(22) Filed: Feb. 21, 2022

(65) Prior Publication Data
US 2022/0274659 A1 Sep. 1, 2022

(30) Foreign Application Priority Data
Mar. 1, 2021 (JP) .................. 2021-031952

(51) Int. Cl.
*H01H 19/14* (2006.01)
*B62H 5/02* (2006.01)
*B62K 23/02* (2006.01)
*G05G 5/00* (2006.01)
*G05G 1/08* (2006.01)

(52) U.S. Cl.
CPC .............. *B62H 5/02* (2013.01); *B62K 23/02* (2013.01); *G05G 1/082* (2013.01); *G05G 5/005* (2013.01); *H01H 19/14* (2013.01); *G05G 2505/00* (2013.01)

(58) Field of Classification Search
CPC ...... H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; B62H 5/02; B62K 23/02; B62K 11/14; G05G 1/082; G05G 5/005; G05G 2505/00; G05G 1/01; G05G 1/02; B62J 1/12; B62J 35/00
See application file for complete search history.

(56) References Cited

U.S. PATENT DOCUMENTS

2008/0164129 A1* 7/2008 Jones .................. H01H 9/22
200/61.81
2008/0223698 A1* 9/2008 Poyner ................ H01H 27/002
200/61.76

FOREIGN PATENT DOCUMENTS

JP 6586309 B2 10/2019

* cited by examiner

*Primary Examiner* — Ahmed M Saeed
(74) *Attorney, Agent, or Firm* — Rankin, Hill & Clark LLP

(57) ABSTRACT

A rotary knob that rotates in a pushed state includes an extending portion extending in a rotation direction of the rotary knob, and the extending portion includes a cutout portion cut out so as to prevent a first switch that detects that the rotary knob is pushed in from being pressed in a case where the rotary knob is in an intermediate range in which the rotary knob is in a pushed state.

13 Claims, 6 Drawing Sheets

VEHICLE OPERATION DEVICE

INCORPORATION BY REFERENCE

The present application claims priority under 35 U.S.C. § 119 to Japanese Patent Application No. 2021-031952 filed on Mar. 1, 2021. The content of the application is incorporated herein by reference in its entirety.

BACKGROUND

Technical Field

The present invention relates to a vehicle operation device.

Related Art

Saddle-ride vehicles such as a motorcycle include a vehicle that includes an operation device including a rotary knob that rotates in a state where the rotary knob is pushed in, and a switch that detects that the rotary knob is pushed in (see, for example, JP 6586309 B2).

In the technique described in JP 6586309 B2, when the switch detects that the rotary knob is pushed in, an authentication control unit provided in a vehicle performs communication processing for authenticating a portable device carried by a driver. In addition, JP 6586309 B2 describes that the rotary knob receives operation of rotating and pushing from an OFF position to a handlebar lock position.

SUMMARY

By the way, if operation of the rotary knob is interrupted between the OFF position and the handlebar lock position and the rotary knob is left in this state, there is a possibility that the rotary knob continuously presses the switch, and the communication processing continues. Continuation of the communication processing increases current consumption even when an ignition is turned off and increases dark currents (also referred to as standby currents). If the dark currents increase, remaining capacity of a battery mounted on the vehicle may decrease.

The present invention has been made in view of the above circumstances, and an object of the present invention is to make it possible to avoid increase in current consumption even when a rotating body such as a rotary knob is left in a pushed state.

A vehicle operation device includes: a rotating body that is rotatable in a pushed state; and a switch that operates as a result of the rotating body being pushed in, a pushing result of the switch is used to execute predetermined operation of an electrical component provided at a vehicle, the switch includes a pressed portion that is to be pressed in conjunction with a pushing result of the rotating body, the rotating body includes a contact portion that is contactable with the switch, and the contact portion includes a cutout portion cut out so as to prevent the pressed portion from being pressed when the rotating body is in an intermediate range corresponding to between a first rotation position at which the vehicle is put into a first state and a second rotation position at which the vehicle is put into a second state different from the first state.

Further, in the above configuration, the contact portion may be provided with an inclined surface extending from the cutout portion toward a surface that presses the pressed portion between the cutout portion and the surface.

Further, in the above configuration, the contact portion may constitute at least part of a bottom surface of the rotating body.

Further, in the above configuration, the vehicle operation device may include a coupling member to be coupled to the rotating body, the rotating body may include an insertion portion into which the coupling member is to be inserted, and at least part of a radially outer portion of the coupling member in the insertion portion may be formed in the contact portion.

Further, in the above configuration, the vehicle operation device may include a cover member that covers a periphery of the rotating body, and the cover member may overlap the contact portion when viewed from a front side of the rotating body.

In the above configuration, the rotating body may be held in a pushed state in a case where the rotating body is in the intermediate range and may freely advance and retreat between a pushed state and an unpushed state in a case where the rotating body is at the first rotation position and the second rotation position.

Further, in the above configuration, the switch may be a switch to be used for executing communication using a communication module included in the electrical component.

In the above configuration, the first rotation position may be a position at which the vehicle is put into a handlebar locked state, and the second rotation position may be a position at which the vehicle is put into at least a handlebar unlocked state.

A vehicle operation device includes: a rotating body that is rotatable in a pushed state; and a switch that operates as a result of the rotating body being pushed in, a pushing result of the switch is used to execute predetermined operation of an electrical component provided at a vehicle, the switch includes a pressed portion that is pressed in conjunction with a pushing result of the rotating body, the rotating body includes a contact portion that is contactable with the switch, and the contact portion includes a cutout portion cut out so as to prevent the pressed portion from being pressed in a case where the rotating body is in an intermediate range corresponding to between a first rotation position at which the vehicle is in a first state and a second rotation position at which the vehicle is in a second state different from the first state. According to this configuration, even if the rotating body is left in the intermediate range in which the rotating body is pushed, the switch can be prevented from being pressed, so that it is possible to avoid increase in current consumption associated with predetermined operation of the electrical component.

Further, in the above configuration, the contact portion may be provided with an inclined surface extending from the cutout portion toward a surface that presses the pressed portion between the cutout portion and the surface. According to this configuration, it is possible to smoothly switch between a pressed state and a non-pressed state of the switch.

Further, in the above configuration, the contact portion may constitute at least part of a bottom surface of the rotating body. According to this configuration, the bottom surface of the rotating body can also serve as the surface that presses the switch, so that it is not necessary to provide another component for pressing the switch.

Further, in the above configuration, the vehicle operation device may include a support member that supports the rotating body, the rotating body may include an insertion portion into which the support member is to be inserted, and at least part of a radially outer portion of the support member in the insertion portion may be formed in the contact portion. According to this configuration, the contact portion is provided using the insertion portion, so that it is not necessary to provide another component for pressing the switch.

Further, in the above configuration, the vehicle operation device may include a cover member that covers a periphery of the rotating body, and the cover member may overlap the contact portion when viewed from a front side of the rotating body. According to this configuration, the contact portion can be made invisible in appearance.

In the above configuration, the rotating body may be held in a pushed state in a case where the rotating body is in the intermediate range and may freely advance and retreat between a pushed state and an unpushed state in a case where the rotating body is at the first rotation position and the second rotation position. According to this configuration, it is easy to avoid a situation in which the switch is continuously pressed even when the rotating body is at any of the intermediate range, the first rotation position, and the second rotation position.

Further, in the above configuration, the switch may be a switch to be used for executing communication using a communication module included in the electrical component. According to this configuration, it is possible to avoid a situation in which the communication is continuously executed even if the rotating body is left in a pushed state, so that it is possible to effectively prevent increase in dark currents.

In the above configuration, the first rotation position may be a position at which the vehicle is put into a handlebar locked state, and the second rotation position may be a position at which the vehicle is put into at least a handlebar unlocked state. According to this configuration, the switch can be prevented from being pressed even if the rotating body is left between the position at which the vehicle is put into the handlebar locked state and the position at which the vehicle is put into the handlebar unlocked state.

DETAILED DESCRIPTION

An embodiment of the present invention will be described below with reference to the drawings. Note that, in the description, each direction such as front, rear, left, and right, and upward and downward is a direction based on a vehicle body unless otherwise specified. In each of the drawings, a reference symbol FR denotes a front direction of the vehicle body, a reference symbol UP denotes an upward direction of the vehicle body, and a reference symbol LH denotes a left direction of the vehicle body.

Figure 1:
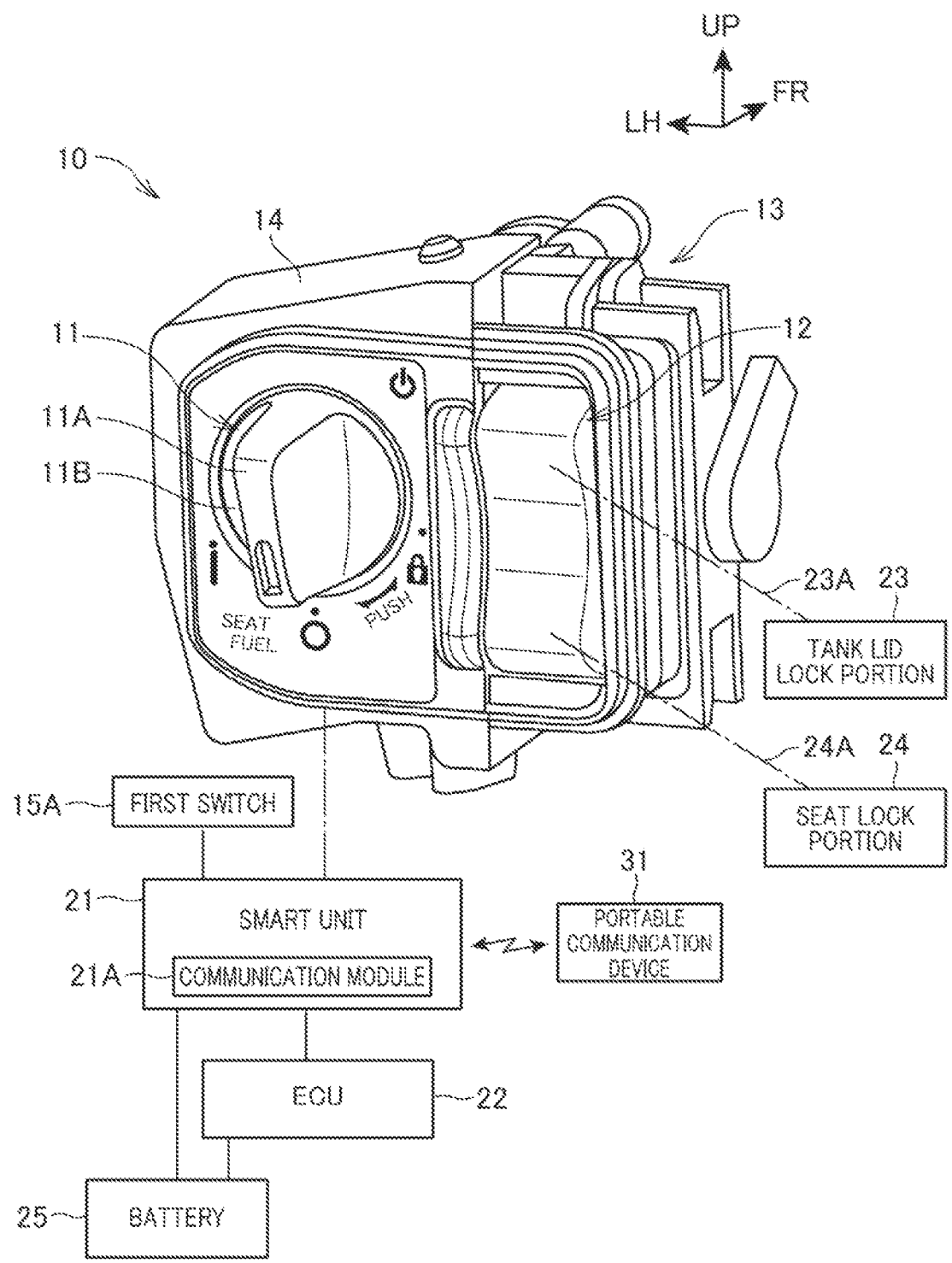
FIG. 1 is a view illustrating a vehicle operation device according to an embodiment of the present invention together with a peripheral configuration.

FIG. 1 is a view illustrating a vehicle operation device according to the embodiment of the present invention together with a peripheral configuration.

A vehicle operation device 10 is an operation device that is disposed around a handlebar of a motorcycle and is operated by a rider (also referred to as a driver). The vehicle operation device 10 has a mechanism for locking the handlebar of the motorcycle and is also referred to as a handlebar lock module.

The vehicle operation device 10 includes a rotary knob 11, a fuel tank lid/seat opener switch 12, a device body 13 that operably supports these, and a cover member 14 that covers part of the device body 13. The cover member 14 is a resin cover that covers a periphery of the rotary knob 11.

The device body 13 supports the rotary knob 11 so that the rotary knob 11 can freely rotate and can be pushed. Further, the device body 13 supports the fuel tank lid/seat opener switch 12 at a position adjacent to a right side of the rotary knob 11 so that the fuel tank lid/seat opener switch 12 can be pressed. The device body 13 further includes a first switch 15A that operates when the rotary knob 11 is pushed in.

The rotary knob 11 is a first operator for operating a handlebar lock, ON/OFF of an ignition (including ON/OFF of an electric circuit), and the like, and functions as a so-called main switch.

The fuel tank lid/seat opener switch 12 is a second operator that unlocks a fuel tank lid mounted on the motorcycle and unlocks a seat, and functions as a so-called sub switch.

The fuel tank lid/seat opener switch 12 of the present configuration pulls a wire 23A in response to pressing operation of a region of an upper half portion and puts a tank lid lock portion (tank lid lock) 23 constituting a lock portion of the fuel tank lid into an unlocked state by pulling of the wire 23A. In addition, the fuel tank lid/seat opener switch 12 pulls a wire 23B in response to pressing operation of a region of a lower half portion and puts the seat lock portion (seat lock) 24 constituting a lock portion of the seat into an unlocked state by pulling of the wire 23B. A widely distributed switch structure can be widely applied to the rotary knob 11 and the fuel tank lid/seat opener switch 12. Hereinafter, the fuel tank lid/seat opener switch 12 will be referred to as a "sub switch 12" for convenience of description.

The motorcycle includes a smart unit 21 and an ECU 22 as electrical components related to the vehicle operation device 10, and the tank lid lock portion 23, the seat lock portion 24, and a battery 25.

The smart unit 21 is also referred to as a smart control unit and is an electrical component that includes a processor and memory, and by executing the programs stored in the memory, performs various kinds of processing related to smart entry. The smart entry is a technology that enables turning on of an ignition of a motorcycle, starting of an engine (internal combustion), and the like, without using a mechanical key.

The smart unit 21 is electrically connected to the vehicle operation device 10, the ECU 22, and the like. More specifically, the smart unit 21 is connected to the vehicle operation device 10 via an electric circuit not illustrated and outputs information indicating operation (pushing operation, rotation position) of the vehicle operation device 10 to the ECU 22 via the electric circuit. The electric circuit is, for example, a circuit that outputs a signal in accordance with a detection result of the first switch 15A (pushing result of the rotary knob 11) and whose contact point on the circuit changes in accordance with the rotation position of the rotary knob 11. Note that an output of the first switch 15A may be directly input to the smart unit 21.

In addition, the smart unit 21 includes a communication module (transmitter/receiver, circuit) 21A and has a function of performing short-distance wireless communication with a portable communication device 31 carried by the rider using the communication module 21A. The portable communication device 31 may be a communication device (transmitter/receiver) dedicated to a motorcycle or a smartphone owned by the rider.

Here, the smart unit 21 performs communication processing of authenticating the authorized portable communication device 31 within a communication range when it is detected by the first switch 15A that the rotary knob 11 is pushed in. This communication processing can also be referred to as monitoring processing of monitoring whether or not the authorized portable communication device 31 is present around the motorcycle.

In other words, the detection result of the first switch 15A (pushing result of the rotary knob 11) is used to execute predetermined operation of the smart unit 21 (corresponding to the communication processing), and is used, for example, as a trigger for starting execution of the communication processing. In this configuration, when a state in which the rotary knob 11 is pushed in is continued on the basis of the detection result of the first switch 15A, the communication processing is continued.

However, the present invention is not limited to an aspect in which the communication processing is continued when the state in which the rotary knob 11 is pushed in is continued. For example, even if the state in which the rotary knob 11 is pushed in is continued, the communication processing may be automatically stopped when a predetermined condition is satisfied. Examples of the predetermined condition include that a response by communication is not returned within a predetermined response waiting time, that a power supply voltage of the battery 25 is equal to or less than a threshold, and the like, and an appropriate condition can be set.

Note that detection by the first switch 15A that the rotary knob 11 is pushed in may be one of the conditions for executing the communication processing described above. For example, on the premise that another execution condition is also satisfied, the communication processing may be executed when the first switch 15A detects that the rotary knob 11 is pushed in.

The ECU 22 includes a processor and memory, and by executing the programs stored in the memory, functions as a vehicle control unit that centrally controls each unit of the motorcycle. More specifically, the ECU 22 inputs an operation status of the vehicle operation device 10, a communication result of the smart unit 21, and the like, and permits engine start, or the like, on the basis of the input information. In this configuration, engine start, or the like, is permitted when the rotary knob 11 is at an "ON position" corresponding to ignition ON, and the smart unit 21 detects that the authorized portable communication device 31 is present around the motorcycle.

Further, the ECU 22 inputs driving operation (for example, operation of a throttle grip), or the like, by the rider through various sensors provided in the motorcycle and performs engine control (control of an intake system, a fuel injection system, and an ignition system), or the like, on the basis of the input information.

The motorcycle includes the battery 25 that supplies operating power to electrical components including the smart unit 21 and the ECU 22. In addition, the motorcycle includes a power generation device that generates power using driving force of the engine and appropriately charges the battery 25 with the generated power from the power generation device.

Figure 2:
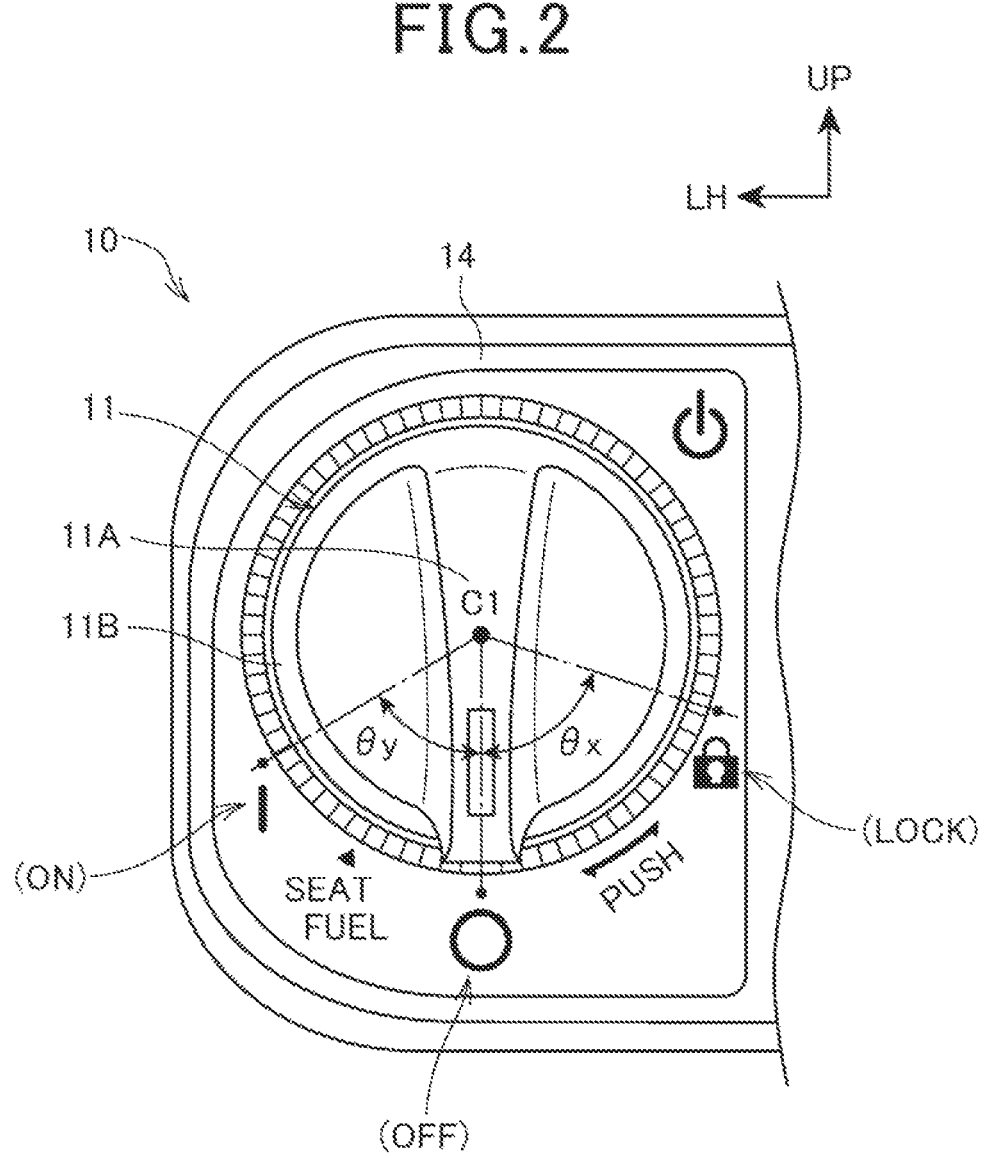
FIG. 2 is a view of a rotary knob of the vehicle operation device as viewed from a front side.

FIG. 2 is a view of the rotary knob 11 of the vehicle operation device 10 as viewed from the front side.

As illustrated in FIG. 2, operation positions corresponding to various states of the motorcycle are set in the vehicle operation device 10. The operation positions include a LOCK position (indicated as "LOCK" in FIG. 2) corresponding to a handlebar lock state, an OFF position (indicated as "OFF" in FIG. 2) corresponding to an ignition OFF state, a SEAT/FUEL position (indicated as "SEAT FUEL" in FIG. 2) corresponding to a state in which the sub switch 12 is enabled, and an ON position (indicated as "ON" in FIG. 2) corresponding to an ignition ON state.

The rotary knob 11 integrally includes a knob body portion 11A to be gripped by the rider and a knob base end portion 11B having a cylindrical shape with the knob body portion 11A side closed and is manufactured through integral molding using a resin material, for example. In FIG. 2, a reference symbol Cl denotes a rotation axis (coincident with the rotation center) of the rotary knob 11. FIG. 2 illustrates a case where the rotary knob 11 is at the OFF position.

The rotary knob 11 can be rotated to the LOCK position, the OFF position, the SEAT FUEL position, and the ON position by being manually operated by the rider. In a rotation range of the rotary knob 11, a range between the LOCK position and the OFF position (range of an angle θx in FIG. 2) is a range in which the rotary knob 11 rotates in a pushed state.

The LOCK position and the OFF position are positions where the rotary knob 11 can freely advance and retreat between a pushed state and an unpushed state. A range between the OFF position and the ON position (range of the angle θy in FIG. 2) is a range in which the rotary knob 11 is rotated in an unpushed state.

The LOCK position is a state in which the vehicle operation device 10 causes the lock mechanism for locking the handlebar to operate and is also an ignition OFF state, that is, a main switch OFF state. The OFF position is not only the ignition OFF state but also a handlebar unlock state.

In the present embodiment, the LOCK position corresponds to a "first rotation position at which the state is put into a first state" of the present invention, and the OFF position corresponds to a "second rotation position at which the state is put into a second state" of the present invention. The range between the LOCK position and the OFF position (range of the angle θx) corresponds to an "intermediate range" of the present invention.

The SEAT/FUEL position is a state in which the tank lid can be unlocked by the tank lid lock portion 23 and the seat can be unlocked by the seat lock portion 24 according to the operation of the sub switch 12. This SEAT/FUEL position is a handlebar unlocked state.

The ON position is a state in which the engine can be started when the ignition is ON and is also a handlebar unlocked state and a main switch ON state. Note that at the ON position, the engine can be started by turning on the ignition when the smart unit 21 determines that the authorized portable communication device 31 is present around the motorcycle.

Figure 3:
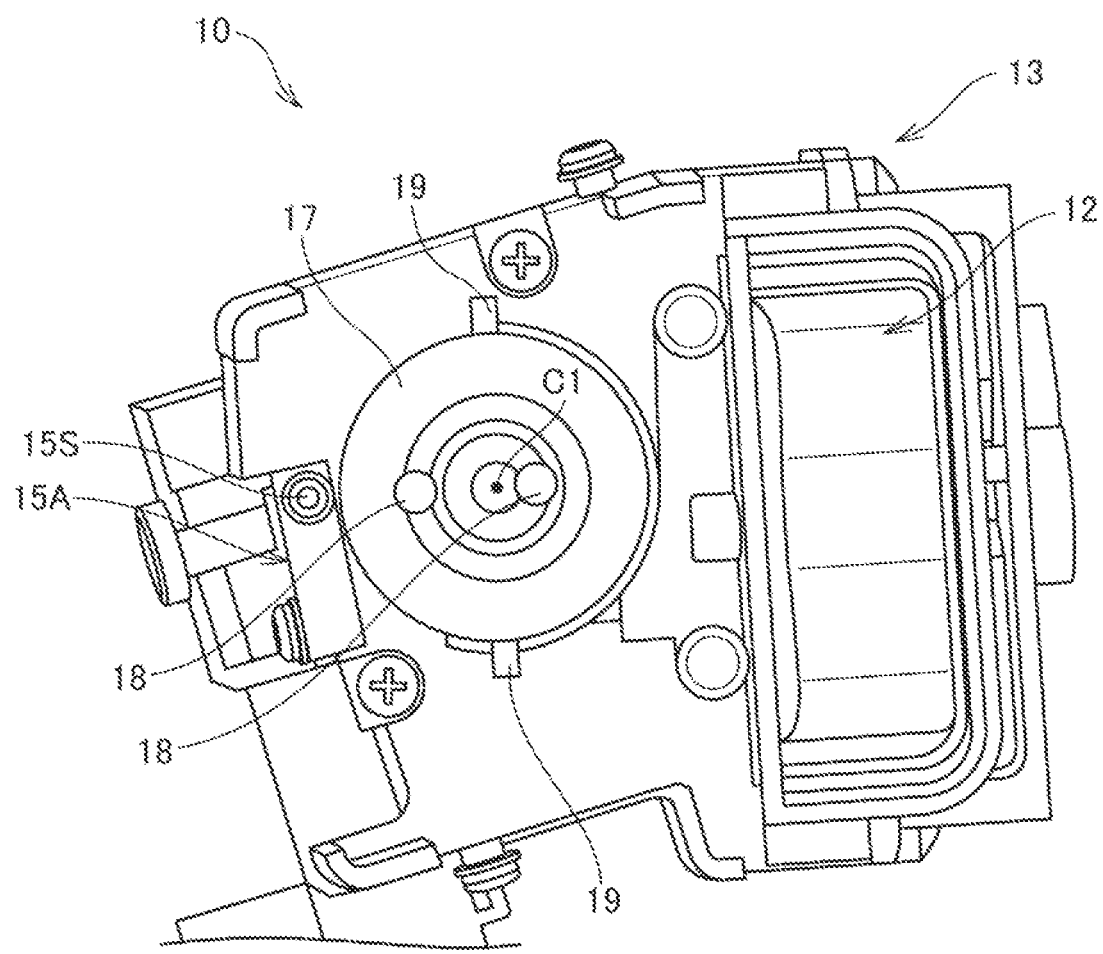
FIG. 3 is a view of the vehicle operation device as viewed from the front side in a state where the rotary knob and a cover member are removed.

FIG. 3 is a view of the vehicle operation device 10 as viewed from the front side in a state where the rotary knob 11 and the cover member 14 are removed.

As illustrated in FIG. 3, the device body 13 is provided with a shaft 17 connected to the rotary knob 11. The shaft 17 is provided on the device body 13 so as to be rotatable about a rotation axis Cl and so as to be able to freely advance and retreat along the rotation axis Cl. The shaft 17 is a member that turns on an ignition switch (not illustrated) or causes the handlebar lock mechanism to operate according to rotation operation, pushing operation, or the like, of the rotary knob 11.

In FIG. 3, a reference numeral 18 denotes a plurality of biasing members disposed between the rotary knob 11 and the shaft 17. A reference numeral 19 denotes a protrusion protruding radially outward from the shaft 17. The protrusion 19 is a member that locks the shaft 17 to the rotary knob 11 so that the rotary knob 11 and the shaft 17 can rotate in an integrated manner.

Figure 4:
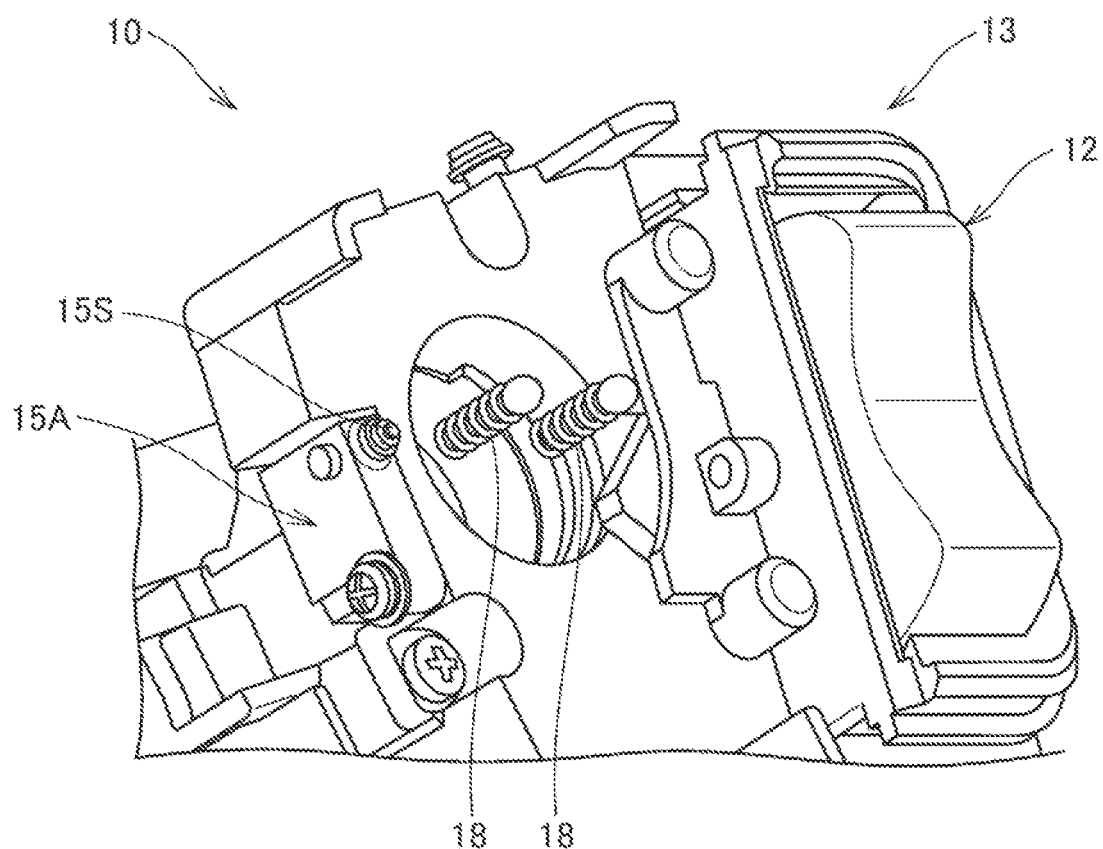
FIG. 4 is a perspective view illustrating a state in which a support member is removed from FIG. 3.
Figure 5:
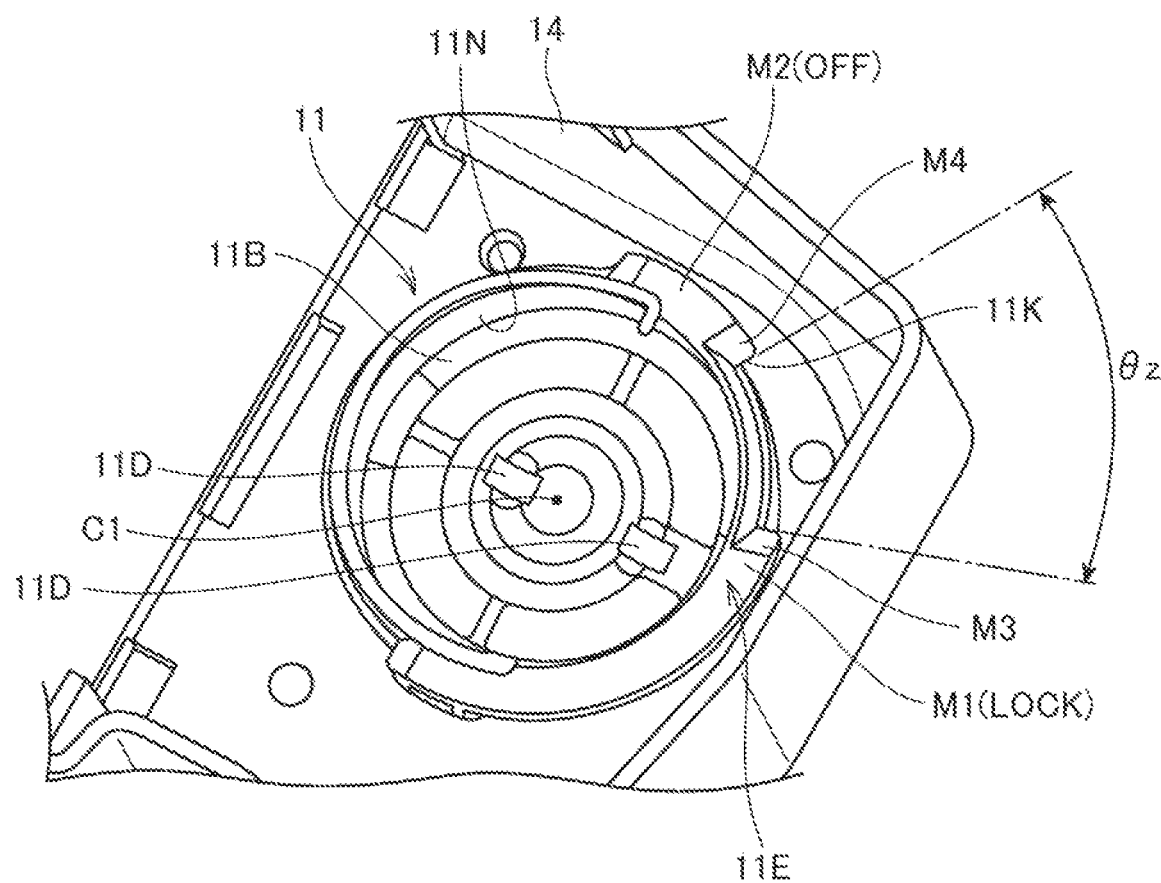
FIG. 5 is a view illustrating the rotary knob and the cover member from a back side.

FIG. 4 is a perspective view illustrating a state in which the shaft 17 is removed from FIG. 3. FIG. 5 is a view illustrating the rotary knob 11 and the cover member 14 from the back side.

As illustrated in FIG. 4, each of the biasing members 18 includes a coil spring. As illustrated in FIG. 5, on the back side of the rotary knob 11, there are provided recesses 11D into which tip portions of the biasing members 18 are to be fitted. The recesses 11D are disposed at intervals at positions shifted from the rotation axis Cl.

The device body 13 is provided with a regulation portion (not illustrated) capable of regulating rotation of the shaft 17. For example, when it is not determined that the authorized portable communication device 31 is present around the motorcycle, rotation of the shaft 17 is regulated by the regulation portion.

When rotation of the shaft 17 is not regulated, the shaft 17 rotates in accordance with the rotation operation of the rotary knob 11, and an ignition switch (not illustrated) can be turned on to start the engine. On the other hand, when rotation of the shaft 17 is regulated, when the rotary knob 11 is forcibly rotated, fitting of tip portions of the biasing members 18 to the recesses 11D is released, and the rotary knob 11 idles with respect to the shaft 17. In other words, the biasing members 18 and the recesses 11D constitute a torque limiter mechanism that causes the rotary knob 11 to idle when the rotation operation is forcibly performed in a state where rotation of the shaft 17 is regulated.

In FIG. 5, a reference numeral 11N denotes an inner peripheral surface of a knob base end portion 11B. The shaft 17 is inserted into the inner peripheral surface. In other words, the knob base end portion 11B is also an insertion portion into which the shaft 17 is to be inserted.

An extending portion 11E extending in a rotation direction of the rotary knob 11 is integrally formed on the knob base end portion 11B on the radially outer side of the inner peripheral surface 11N.

The extending portion 11E can also be referred to as an enlarged diameter portion that expands on the radially outer side of the rotary knob 11 on the back side of the cover member 14. The extending portion 11E is covered with the cover member 14 when the rotary knob 11 is viewed from the front side, and thus, is not exposed to appearance. Further, the extending portion 11E can also function as a stopper that prevents the rotary knob 11 from coming out of the cover member 14. A bottom surface of the extending portion 11E is formed on the same plane and constitutes part of the bottom surface of the rotary knob 11.

In this configuration, when the rotary knob 11 is at least at the LOCK position and the ON position, the first switch 15A is located on the back side of the extending portion 11E.

As illustrated in FIG. 3, the first switch 15A is disposed on the radially outer side of the shaft 17 and on the opposite side (left side) of the sub switch 12 with respect to the rotary knob 11. The first switch 15A has a protrusion 15S protruding to the rotary knob 11 side (corresponding to the extending portion 11E side).

When the rotary knob 11 is at the LOCK position and the ON position, the protrusion 15S is positioned on the back side of the extending portion 11E, and thus, when the rotary knob 11 is pushed in, the protrusion 15S is pressed by the extending portion 11E. In the present configuration, when the protrusion 15S is pressed, the smart unit 21 performs communication processing of monitoring whether or not the authorized portable communication device 31 is present around the motorcycle.

Figure 6:
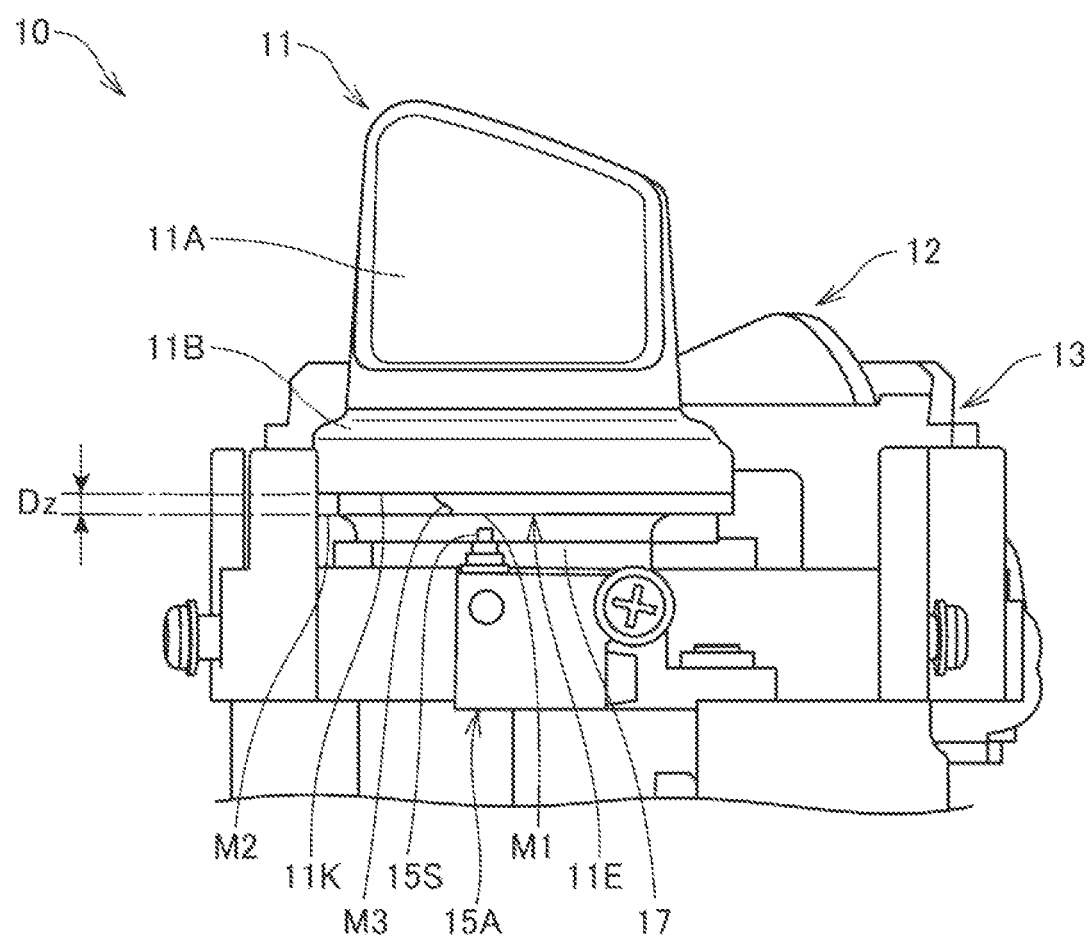
FIG. 6 is a view illustrating the rotary knob and a first switch in a case where the rotary knob is at a LOCK position together with a peripheral configuration.

FIG. 6 is a view illustrating the rotary knob 11 and the first switch 15A when the rotary knob 11 is at the LOCK position together with the peripheral configuration. In FIG. 6, the cover member 14 is removed, and the rotary knob 11 is not pushed in.

As illustrated in FIGS. 5 and 6, the extending portion 11E has a first surface M1 facing the protrusion 15S when the rotary knob 11 is at the LOCK position and a second surface M2 facing the protrusion 15S when the rotary knob 11 is at the OFF position. Thus, when the rider performs pushing operation of the rotary knob 11 in a state where the rotary knob 11 is at the LOCK position or the OFF position, the protrusion 15S is pressed, and the communication processing is started. When the state becomes a state where the rotary knob 11 is not pushed in and the protrusion 15S is not pressed, the communication processing is stopped at a predetermined timing.

In this configuration, as illustrated in FIGS. 5 and 6, a cutout portion 11K cut out on the opposite side of the protrusion 15S is formed between the first surface M1 and the second surface M2 in the extending portion 11E. A range of the cutout portion 11K (range of the angle θz illustrated in FIG. 5) is set to a range overlapping with the protrusion 15S in a front view of the rotary knob 11 while the rotary knob 11 moves from the LOCK position to the OFF position.

A depth Dz (see FIG. 6) of the cutout portion 11K is set to a depth at which the cutout portion 11K does not come into contact with the protrusion 15S even when the rotary knob 11 is pushed in.

As a result, while the rotary knob 11 moves in the range of the angle θx illustrated in FIG. 2 (intermediate range between the LOCK position and the OFF position), the protrusion 15S of the first switch 15A is prevented from being pressed except in a case where the rotary knob 11 is at the LOCK position and the OFF position.

Thus, even if the rotary knob 11 is left in the middle between the LOCK position and the OFF position, it is possible to avoid a situation in which the smart unit 21 continues the communication processing.

In a case where there is no cutout portion 11K, when the rotary knob 11 is left in the middle between the LOCK position and the OFF position, the protrusion 15S of the first switch 15A is continuously pressed, and the smart unit 21 continues the communication processing. The communication processing relatively requires power, and thus, current consumption at the time of ignition OFF, that is, dark currents increase, and the remaining capacity of the battery 25 may decrease.

On the other hand, in this configuration, the communication processing can be prevented from being continued, so that it is possible to prevent decrease in the remaining capacity of the battery 25.

Further, as illustrated in FIGS. 5 and 6, in the extending portion 11E, an inclined surface M3 extending from the cutout portion 11K toward the first surface M1 is formed between the first surface M1 and the cutout portion 11K. Further, in the extending portion 11E, an inclined surface M4 extending from the cutout portion 11K toward the second surface M2 is formed between the second surface M2 and the cutout portion 11K.

The inclined surfaces M3 and M4 enable smooth switching between a pressed state and a non-pressed state of the protrusion 15S of the first switch 15A when the rotary knob 11 is rotated in a pushed state.

As described above, in the vehicle operation device 10 of the present embodiment, the rotary knob 11 has the extending portion 11E extending in the rotation direction of the first switch 15A, and the first switch 15A has the protrusion 15S to be pressed by the extending portion 11E. The extending portion 11E has the cutout portion 11K cut out so as to prevent the protrusion 15S from being pressed when the rotary knob 11 is in an intermediate range corresponding to between the LOCK position and the OFF position.

According to this configuration, when the rotary knob 11 is left in the intermediate range corresponding to between the LOCK position and the OFF position, that is, when the rotary knob 11 is left in a pushed state, it is possible to avoid a situation in which the first switch 15A is continuously pressed. It is therefore possible to prevent increase in dark currents, so that it is possible to prevent decrease in the remaining capacity of the battery 25.

Note that the rotary knob 11 is an example of a "rotating body" of the present invention, and the first switch 15A is an example of a "switch that operates as a result of the rotating body being pushed in" of the present invention. In addition, the extending portion 11E is an example of a "contact portion that that is contactable with the first switch" in the present invention, and the protrusion 15S is an example of a "pressed portion that is pressed in conjunction with a pushing result of the rotating body" in the present invention.

In the extending portion 11E, inclined surfaces M3 and M4 extending from the cutout portion 11K toward the respective surfaces M1 and M2 are formed between the cutout portion 11K and the first surface M1 and the second surface M2 corresponding to the surfaces that press the protrusions 15S.

This configuration enables smooth switching between a pressed state and a non-pressed state of the first switch 15A, so that it is possible to reduce a mechanical load associated with operation of the protrusion 15S, which is advantageous for improving the life of the first switch 15A. In addition, it is also possible to prevent fluctuation of the operation force required for rotation of the rotary knob 11, which is also advantageous for improving operational feeling of the rotary knob 11.

The angles, and the like, of the inclined surfaces M3 and M4 may be appropriately set, and curved surfaces may be adopted for the inclined surfaces M3 and M4.

In addition, the extending portion 11E constitutes at least part of the bottom surface of the rotary knob 11, and thus, the bottom surface of the rotary knob 11 can also be used as a surface that presses the first switch 15A. It is therefore not necessary to provide another component for pressing the first switch 15A, so that the extending portion 11E can be easily provided.

In addition, the rotary knob 11 has the knob base end portion 11B that functions as an insertion portion into which the shaft 17 is to be inserted. At least part of a portion of the knob base end portion 11B on the radially outer side of the shaft 17 is formed in the extending portion 11E. As described above, the extending portion 11E is provided using the knob base end portion 11B into which the shaft 17 is to be inserted, and thus, it is not necessary to provide another component for pressing the first switch 15A, so that the extending portion 11E can be easily provided. The shaft 17 is an example of a "coupling member to be coupled to the rotating body" of the present invention.

Further, the cover member 14 that covers the periphery of the rotary knob 11 is provided, and the cover member 14 overlaps the extending portion 11E and covers the extending portion 11E when viewed from the front side of the rotary knob 11 as illustrated in FIGS. 5 and 1. This can make the extending portion 11E invisible in appearance, which can make it easier to improve the appearance and make it difficult for the rotary knob 11 to fall off from the cover member 14.

In addition, the rotary knob 11 is held in a pushed state in a case where the rotary knob 11 is in an intermediate range between the LOCK position and the OFF position and can freely advance and retreat between a pushed state and an unpushed state in a case where the rotary knob 11 is at the LOCK position and the OFF position. This can put the rotary knob 11 into an unpushed state except in a case where the rotary knob 11 is in the intermediate range between the LOCK position and the OFF position, which can make it easier to avoid a situation in which the first switch 15A is continuously pressed even if the rotary knob 11 is at any of the intermediate range, the LOCK position, and the OFF position.

In addition, the first switch 15A is a switch to be used for executing communication with the portable communication device 31 using the communication module 21A. According to this configuration, even if the rotary knob 11 is left in a pushed state, it is possible to avoid a situation where the communication is continuously executed, so that it is possible to effectively prevent increase in dark currents.

The embodiment described above is merely an example of one aspect of the present invention and can be optionally modified and applied without departing from the gist of the present invention.

For example, while in the above-described embodiment, a case has been described where the cutout portion 11K does not press the protrusion 15S when the rotary knob 11 is between the LOCK position and the OFF position, the present invention is not limited thereto.

If a range in which the rotary knob 11 rotates in a pushed state is provided between different positions other than the LOCK position and the OFF position, the cutout portion 11K may be provided between the different positions so as to prevent the rotary knob 11 from pressing the protrusion 15S. In other words, the first rotation position and the second rotation position of the present invention are not limited to the LOCK position and the OFF position.

Further, the configuration of each unit of the vehicle operation device 10 illustrated in FIG. 1, and the like, is merely an example, and may be changed as appropriate. In addition, in the above-described embodiment, while a case has been described where the communication processing is executed when it is detected by the first switch 15A that the rotary knob 11 is pushed in, the present invention is not limited thereto.

For example, the communication processing can be regarded as one of a plurality of kinds of processing related to smart entry to be performed by the smart unit 21. When it is detected by the first switch 15A that the rotary knob 11 is pushed in, another processing related to the smart entry may be further performed, or another processing related to the smart entry may be executed instead of the communication processing. Further, when it is detected by the first switch 15A that the rotary knob 11 is pushed in, processing not related to smart entry may be executed.

In short, it is possible to avoid increase in dark currents by applying the present invention to a case where a predetermined electrical component performs predetermined operation when it is detected by the first switch 15A that the rotary knob 11 is pushed in.

While a case has been described in the above-described embodiment where the present invention is applied to a vehicle operation device to be used in a motorcycle, the present invention is not limited thereto. For example, the present invention may be applied to a vehicle operation device to be used in a saddle-ride vehicle including a three-wheel vehicle and a four-wheel vehicle in addition to a motorcycle.

REFERENCE SIGNS LIST

10 Vehicle operation device
11 Rotary knob (rotating body, first operator)
12 Fuel tank lid/seat opener switch (sub switch, second operator)
13 Device body
14 Cover member
11A Knob body portion
11B Knob base end portion (insertion portion)
11D Recess
11E Extending portion (contact portion)
11K Cutout portion
14 Cover member
15A First switch
15S Protrusion (pressed portion)
17 Shaft (coupling member)
18 Biasing member
21 Smart unit (electrical component)
21A Communication module
22 ECU
23 Tank lid lock portion
24 Seat lock portion
25 Battery
31 Portable communication device
M1 First surface
M2 Second surface
M3, M4 Inclined surface

What is claimed is:

1. A vehicle operation device comprising: a rotating body that is rotatable while maintaining a pushed state in a rotation axis direction; and a switch that operates as a result of the rotating body being pushed in, wherein:
   a pushing result of the switch is used to execute a predetermined operation of an electrical component provided at a vehicle,
   the switch includes a pressed portion that is to be pressed in conjunction with a pushing result of the rotating body,
   the rotating body includes a contact portion that is contactable with the switch, and
   the contact portion presses the pressed portion by the rotating body being pushed in when the rotating body is in a first rotation position at which the vehicle is put into a first state and a second rotation position at which the vehicle is put into a second state different from the first state, and the contact portion includes a cutout portion that is cut out so as to not press the pressed portion when the rotating body is pushed in when the rotating body is in an intermediate range between the first rotation position and the second rotation position.

2. The vehicle operation device according to claim 1, wherein the contact portion is provided with an inclined surface that extends from the cutout portion toward a surface that presses the pressed portion.

3. The vehicle operation device according to claim 2, wherein the contact portion constitutes at least part of a bottom surface of the rotating body.

4. The vehicle operation device according to claim 3, further comprising:
   a coupling member to be coupled to the rotating body,
   wherein the rotating body includes an insertion portion into which the coupling member is inserted, and
   at least part of a radially outer portion of the coupling member in the insertion portion is formed in the contact portion.

5. The vehicle operation device according to claim 4, further comprising:
   a cover member that covers a periphery of the rotating body,
   wherein the cover member overlaps the contact portion when viewed from a front side of the rotating body.

6. The vehicle operation device according to claim 1, wherein the rotating body is held in a pushed state in a case when the rotating body is in the intermediate range and freely advances and retreats between a pushed state and an unpushed state when the rotating body is at one of the first rotation position and the second rotation position.

7. The vehicle operation device according to claim 1, wherein the switch is a switch to be used for executing communication using a communication module included in the electrical component.

8. The vehicle operation device according to claim 1, wherein the first rotation position is a position at which the vehicle is put into a handlebar locked state, and the second rotation position is a position at which the vehicle is put into at least a handlebar unlocked state.

9. A vehicle operation device comprising: a rotary knob that is rotatable by operation of a driver while maintaining a pushed state in a rotation axis direction; and a switch that operates as a result of the rotary knob being pushed in, wherein:
   a pushing result of the switch is used to execute communication processing between a communication module included in an electrical component provided at a vehicle and a communication device carried by the driver,
   the switch includes a pressed portion that is to be pressed in conjunction with a pushing result of the rotary knob,
   the rotary knob includes a contact portion that is contactable with the switch, and
   the contact portion presses the pressed portion by the rotary knob being pushed in when the rotary knob is in a first rotation position at which the vehicle is put into a first state corresponding to a handlebar lock state and a second rotation position at which the vehicle is put into a second state corresponding to a handlebar unlock state, and the contact portion includes a cutout portion that is cut out so as to not press the pressed portion even when the rotary knob is pushed in when the rotary knob is in an intermediate range between the first rotation position and the second rotation position.

10. The vehicle operation device according to claim 9, wherein the contact portion is formed with an inclined surface that is disposed between the cutout portion and a surface for pressing the pressed portion.

11. The vehicle operation device according to claim 10, wherein the contact portion constitutes at least a part of a bottom surface of the rotary knob.

12. The vehicle operation device according to claim 11, further comprising a coupling member to be coupled to the rotary knob, wherein
the rotary knob includes an insertion portion into which the coupling member is inserted, and
at least part of a radially outer portion of the coupling member in the insertion portion is formed in the contact portion.

13. The vehicle operation device according to claim 12, further comprising:
a cover member that covers a periphery of the rotary knob,
wherein the cover member overlaps the contact portion when viewed from a front side of the rotary knob.

* * * * *